United States Patent [19]
Balint et al.

[11] 3,765,582
[45] Oct. 16, 1973

[54] SYNCHRONIZED GENERATOR FOR A PHOTOGRAPHIC FILM PRINTER

[75] Inventors: Andrew Balint, Park Ridge; Willi G. Engel, Evanston, both of Ill.

[73] Assignee: Bell & Howell Company, Chicago, Ill.

[22] Filed: Sept. 13, 1971

[21] Appl. No.: 179,733

[52] U.S. Cl. .......................... 226/9, 226/33, 226/76, 226/100
[51] Int. Cl. .................................................. B65h 25/00
[58] Field of Search ..................... 226/9, 33, 43, 76, 226/100

[56] References Cited
UNITED STATES PATENTS

| | | | |
|---|---|---|---|
| 3,381,867 | 5/1968 | Konkel .................................. | 226/9 |
| 3,332,084 | 7/1967 | Wahrer et al. ...................... | 226/9 X |
| 3,148,585 | 9/1964 | Armstrong et al. .............. | 226/100 X |
| 3,053,426 | 9/1962 | Sheldon ......................... | 226/100 X |

Primary Examiner—Allen N. Knowles
Attorney—William K. Serp et al.

[57] ABSTRACT

A motor drives a pulse generating detent disc through a power transmission train. The detent disc is coupled to a film drive sprocket and the sprocket draws the film across the exposure aperture of the printer. The detent disc defines a plurality of apertures which permit light to pass through onto a photocell so that as the disc and the sprocket are rotated pulses are generated by the photocell related to the amount of film passing through the printer. When the printer aperture gate is opened a pawl is forced against the detent disc causing it to lock in one of a plurality of preselected detent positions until the drive motor is energized.

10 Claims, 4 Drawing Figures

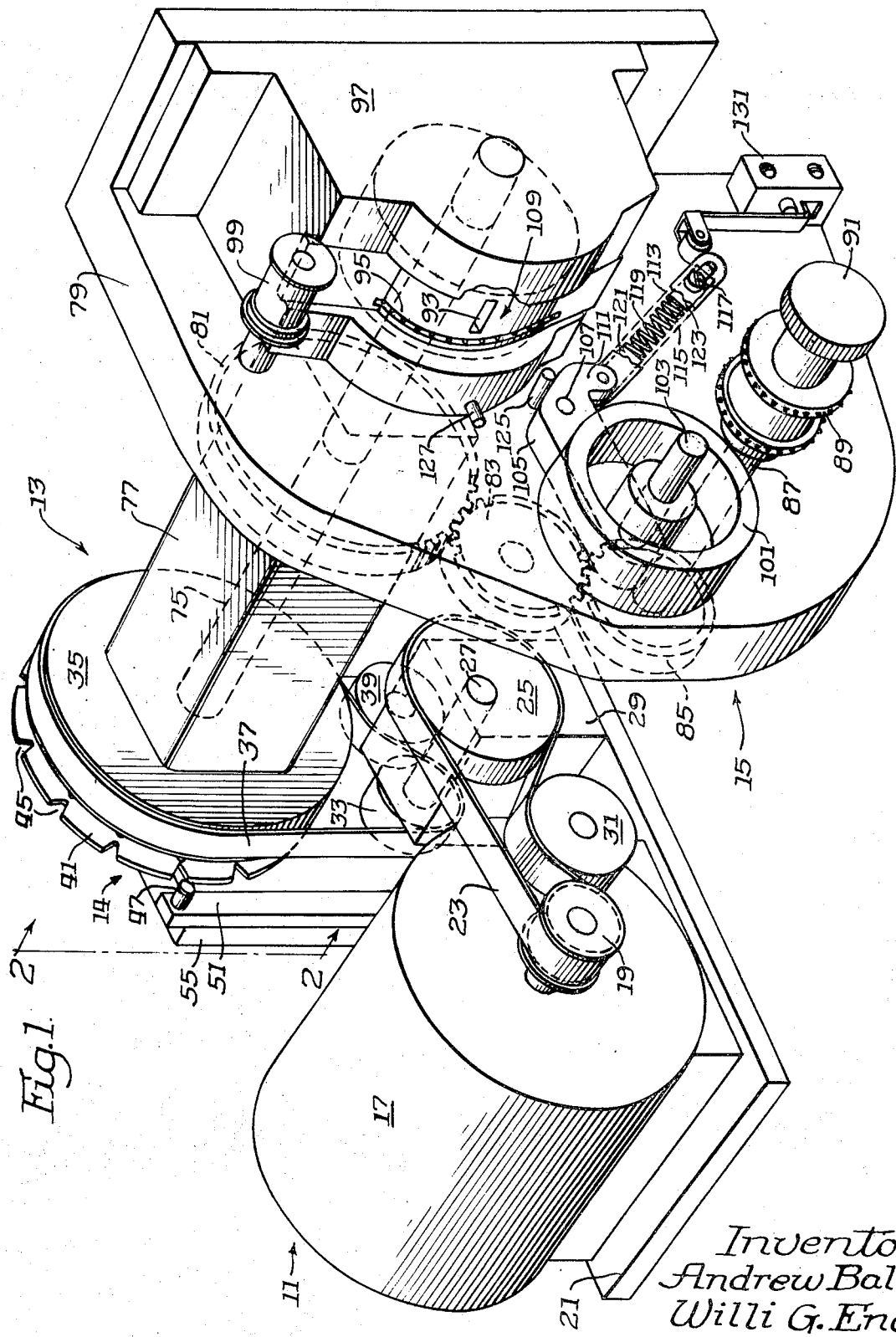

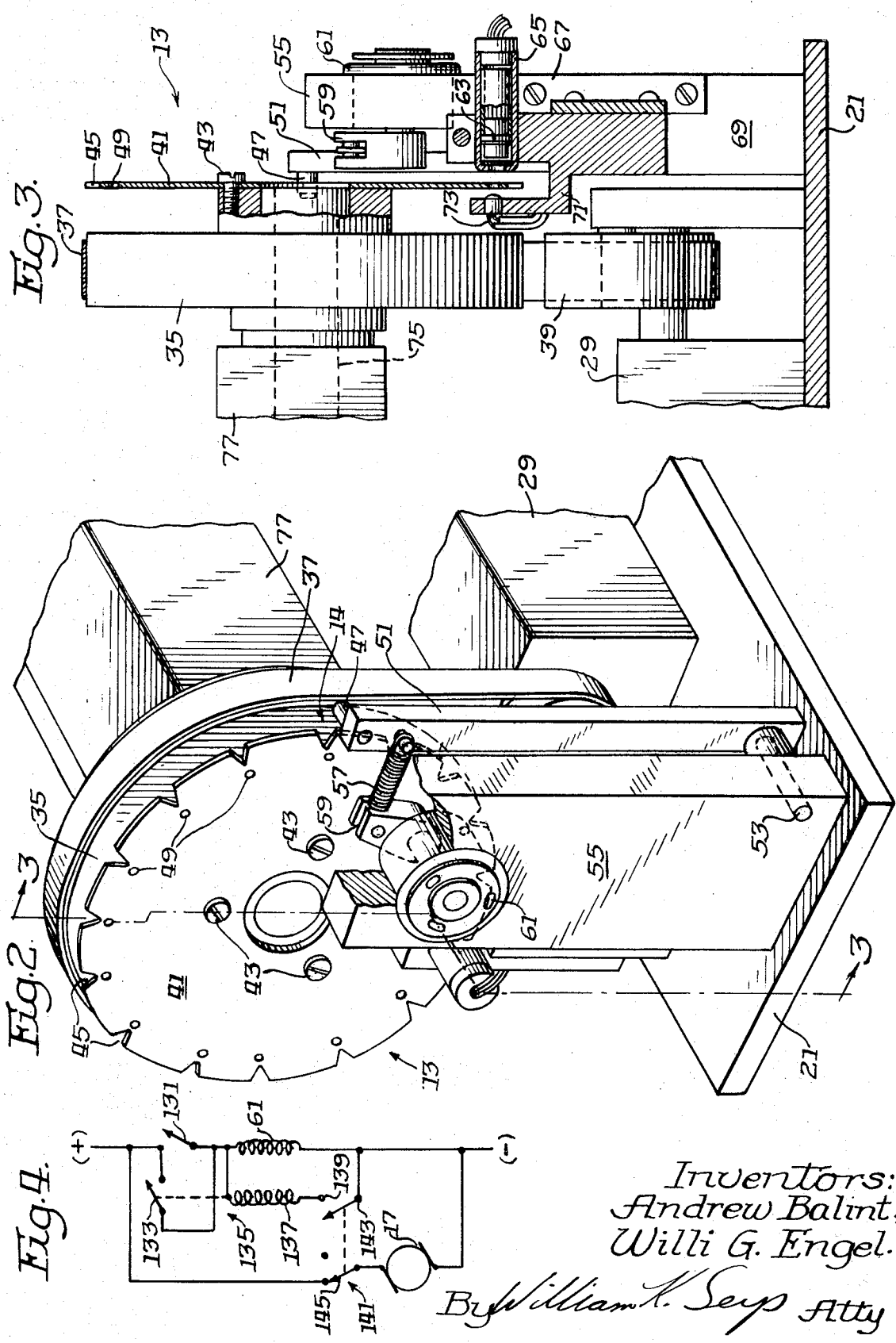

SYNCHRONIZED GENERATOR FOR A PHOTOGRAPHIC FILM PRINTER

BACKGROUND OF THE INVENTION

This invention generally relates to an apparatus for generating a control signal related to the quantity of film passing through a photographic film printer, and more particularly relates to a pulse generator for use with a continuous photographic film printer wherein exposure lighting compensation for scene changes is initiated by a frame count cuer.

During the operation of a continuous film printer, an unexposed film or "raw stock" is placed in overlaying relation to a "preprint" film. The "preprint" film and the overlayed "raw stock" are in sprocket hole registration and driven by a single sprocket wheel across an aperture slit for exposure by a controlled light source. The "raw stock" is thus exposed in accordance with the image of the "preprint" film and thereafter developed by conventional means.

In connection with the filming of the "preprint", the various scenes which make up the complete film are frequently photographed at different locations and under varying lighting conditions. To minimize or eliminate the lighting and color variations which occur as a result of variations in lighting during the initial filming, each of the scenes of the "preprint" often require different optimum printing light levels and color balance during exposure of the "raw stock." Prior to exposure of the "raw stock" the "preprint" film is visually inspected by a skilled operator for the purpose of determining the intensity and hue of the compensation desired for each scene.

According to present practice, lighting compensation for each scene as well as the length of the scene to which the compensation relates is recorded by punching a tape. The punched tape is utilized to control a film cuer which in turn controls the light valves of a variable light source focused upon the printer exposure aperture. Such continuous film printers additionally include a signal generator providing an output signal related to the amount of film which has passed through the printer. The length of the scene is read by a frame count cuer from the punched tape, and the output of the generator is fed to the cuer. The quantity of film passing through the printer is compared to the prerecorded scene length. When the two sources of information coincide, a cue signal is generated, effecting a correction in exposure lighting.

It will be appreciated that the preprint film must be accurately positioned with respect to the aperture at the start of the printing process to assure that the cue signals and corresponding lighting corrections will occur precisely at that point on the "preprint" where the scene change occurs. In the event the "preprint" is retarded or advanced with respect to its desired starting position, the cue signals will occur either early or late, by the amount of the error initially introduced. A further complication is introduced by the fact that the operator must thread the "preprint" and "rawstock" through the printer under conditions of almost complete darkness to prevent ambient light from exposing the "raw stock."

A main purpose of this invention is to provide a signal generator for use with a continuous film printer having a frame count cueing system of scene length measurement. The generator supplies a signal to the cuer related to the quantity of film passing through the printer and includes means for assuring that the count is started at precisely the desired point on the "preprint" film. In this manner the generator is synchronized with the film and the exposure aperture thereby ensuring that the cue signals will be generated at the start of the next scene.

Other objects and advantages of this invention will be apparent from the description of the accompanying drawings in which:

DESCRIPTION OF THE DRAWINGS

FIG. 1 is a prospective view of a portion of a continuous film printer including certain features of this invention;

FIG. 2 is a partial prospective view of the embodiment illustrated in FIG. 1, taken along the line 2—2;

FIG. 3 is a partial sectional view of the embodiment illustrated in FIG. 1 taken along the line 3—3 of FIG. 2; and FIG. 4 is an electrical schematic diagram of the apparatus illustrated in FIG. 1.

DESCRIPTION OF THE ILLUSTRATED EMBODIMENT

With particular reference to FIG. 1, the illustrated embodiment includes power drive means 11 which rotatably drives a signal generating means 13 and synchronization means 14 coupled to a printer gate apparatus assembly 15. The power drive means 11 comprises a drive motor 17 including a motor pulley 19. The motor is securely mounted upon a support plate 21 which forms a portion of the frame of the printer. Serving to couple the motor 17 to the signal generating means 13 is a drive motor belt 23 which is passed about the motor pulley 19 and around a drive pulley 25. The drive pulley 25 is supported upon a drive shaft 27 journaled through a drive shaft support housing 29 also mounted upon the support plate. Serving to maintain tension in the drive belt 23 is a drive belt tension pulley 31 which is mounted by suitable means (not shown) to the support plate 21. The remaining end of the drive shaft 27 carries a drum 33 coupled to a detent disc drive drum 35 by means of a drive drum belt 37. Serving to maintain tension in the drive drum belt 37 is a tension drum 39 which is supported upon the support plate 21 by means not shown. Thus, as the drive motor 17 rotates a speed reduction is accomplished through the power transmission train previously described causing the detent disc drive drum 35 to be rotated at a reduced motor speed.

As illustrated in FIG. 2, the synchronizing means 13 includes a rotatably driven member in the form of a detent disc 41 which is detachably mounted to the drive drum 35 by means of mounting screws 43. The circumference of the detent disc 41 defines a plurality of equally spaced falls or notches forming detents 45 into which a detent pawl 47 drops thus locking the disc in a preselected position. Additionally, the detent disc 41 defines a plurality of equally spaced aperture holes 49. As illustrated in the preferred embodiment each hole is radially aligned with a detent 45. The holes 49 are located in a circular path concentric with the disc 41. As will subsequently be further considered the arcuate distance between each hole is related to the length of a single film frame. The detent pawl 47 is carried by one end of a follower arm 51 the remaining end of which is pivotally mounted upon a pivot rod 53 secured to a solenoid support plate 21 of the printer. The free end of the follower arm 51 is connected to a follower arm spring 57, the remaining end of which is secured to one end of a solenoid crank 59. The solenoid crank 59 is fixed to the armature shaft of a rotary solenoid 61 which is mounted upon the upwardly disposed end of the solenoid support column 55. In the de-energized position of the solenoid, the detent pawl 47 is biased out of engagement with the detent disc 41 by means of an armature spring formed as part of the solenoid 61. Upon energization of the solenoid 61 the solenoid crank 59 is rotated in a counterclockwise direction as viewed in FIG. 2 causing the follower arm 51 to move toward the circumference of the disc 41 forcing the detent pawl 47 into engagement with the disc 41.

With reference to FIG. 3, the signal generating means 13 includes a photocell 63, particularly sensitive to the infrared spectrum, mounted in a photocell housing 65 which is secured to a housing support bracket 67. The support bracket 67 is in turn secured to the printer support plate by means of an upright support member 69. The photocell housing support bracket 67 defines a light support arm 71 which carries a light source in the form of an infrared lamp 73. The bracket 71 is spacially positioned from the photocell housing 65 by a distance sufficient to permit passage of the disc 41 between the photocell 63 and the light 73. The detent disc 41 is positioned between the photocell 63 and the light source 73, with the circular hole path aligned with the light source 73. Thus, as the disc 41 rotates the light source is periodically interrupted causing the photocell 73 to generate a pulse for every film frame passing through the printer gate aperture assembly 15.

As illustrated in FIG. 1, the detent disc drive drum is rotatably mounted upon a drive drum support shaft 75 which is journaled through a support shaft housing 77. The support shaft housing 77 is mounted upon a gate assembly chassis 79 secured to the printer frame. Pinned to the support shaft 75 is a drive gear 81 which engages an idler gear 83 which in turn engages a film takeup pinion 85 mounted upon a takeup sprocket shaft 87. Supported upon the remaining end of the takeup sprocket shaft 87 and serving to rotate with the drive drum 35 through the gear train is a takeup sprocket 89 and manual drive means in the form of an alignment knob 91. Secured to the drive drum shaft and serving to draw the film across an aperture 93 is a film drive sprocket 95 which forms part of the printer aperture gate assembly 15. The teeth of the sprocket 95 are spaced for registration with the sprocket holes of the film being drawn through the printer and the spacing of the holes 49 in the disc 41 is such that a pulse is generated for each film frame drawn across the printer aperture 93. A controlled light source housing 97 is mounted upon the chassis 79. The housing defines the printer aperture 93 and serves to house a variable light source (not shown) for exposure of the raw stock. Additionally, supported upon the light source housing 97 and serving to guide the film is a film guide roller 99.

The printer gate assembly further includes a gate roller 101 rotatably supported upon a gate roller support rod 103 one end of which is secured to and projects from a gate roller arm 105. The gate roller arm 105 is rotatably pivoted upon a pivot rod 107 supported upon the chassis 79. One end of the gate roller support rod 103 projects from the gate roller 101 to facilitate manual positioning of the roller 103 with respect to a film gate 109 defined by the light housing 97. Depending downwardly, as viewed in FIG. 1, from the gate roller arm 105 is a lug 111 having pivotably secured thereto a spring loaded locking arm 113 forming a toggle mechanism for the gate roller 101. The locking arms 113 includes an elongated housing 115, one end of which is pivotally secured to the lug 111 and the remaining end of which is slotted for sliding engagement with a retaining screw 117 threaded into the chassis. Maintained within the housing is a compression spring 119 the ends of which engage a pair of spring retaining studs 121 and 123. The studs 121 and 123 are respectively secured to the lug 111 and the retaining screw 117 thereby biasing the lug 111 away from the retaining screw 117. Rotational movement of the arm 105 is limited in the open position of the gate roller by a limit rod 125 which projects from the chassis 79 and engages the lug 111 at its maximum counterclockwise position and by a stop 127 which projects from the light housing 97 and engages the arm 105 when in its maximum clockwise position. Positioned for actuation by the locking arm 105 is normally closed microswitch 131. When the roller 101 is positioned adjacent the aperture 93, wherein it maintains the film in engagement with the film drive sprocket 95, the switch 131 is open. The switch 131 is connected to the rotary solenoid 61 for energization thereof. When the gate roller 101 is toggled to the position illustrated in FIG. 1, the film gate 109 is open and ready for threading. Movement of the roller 101 to the open position causes the housing 115 to release the microswitch 131 thereby actuating the solenoid 61 moving the detent pawl 47 into engagement with the outer surface of the detent disc 41.

As illustrated in FIG. 4, the solenoid 61 is connected in series with the microswitch 131 across a power source (not shown). A normally open contact 133 of a holding relay 135 is connected in parallel with the microswitch 131. One terminal of solenoid 137 of the relay 135 is connected to the moveable member of the relay contacts 133 and the remaining terminal to a fixed member 139 of a double pole single throw motor switch 141. A moveable member 143 of the switch 141 is connected to one terminal of the solenoid 61 which is also connected to one terminal of the motor 17. The remaining terminal of the motor is connected to the remaining terminal of the power source through the second pole 145 of the switch 141.

In operation, the motor is turned off by throwing the motor switch 141 thereby connecting one terminal of the solenoid 137 to a terminal of the power source. The aperture gate roller 101 is manually locked into the position illustrated in FIG. 1 by the operator grasping the gate roller support rod 103 and rotating the gate roller about its pivot rod 107. This movement actuates the switch 131 causing the solenoid 61 to be energized forcing the detent pawl 47 against the edge of the detent disc 41. The relay 135 is also energized closing the contacts 133 in parallel with the microswitch 131. The operator grasps the film alignment knob 91. Rotation of the knob 91 results in rotation of the detent disc 41 and the drive sprocket 95. Movement is free until the detent pawl 47 drops into a notch 45 defined by the detent disc 41. Thus, the operator experiences a definite restriction in the movement of the knob 91 which is particularly convenient since, as previously mentioned, the operation is performed in substantially total darkness. The pawl 47 is positioned with respect to the disc 41 so that when it falls into a notch 45 in the detent disc 41, a hole will be aligned with the light 73 permitting light to pass to the photocell 63. The operator then positions the film and the unexposed raw stock in the gate so that a "sync-hole" which is conventionally punched in the "preprint" film and indicates the start of the film is positioned over the aperture slit. The described procedure assures that the "preprint" film is properly positioned with respect to the exposure aperture 93 and that the pulse generating means 13 will transmit a pulse at each frame line as the film passes across the aperture. Further, this procedure assures that the count will start at a predetermined point on the film thereby assuring synchronization between the film, the aperture 93 and the signal generating means 13.

After threading, the gate roller 101 is swung in a clockwise direction to close the gate 109 thereby urging the film against the exposure aperture 93 and maintaining engagement of the film with the film drive sprocket 93. Positioning of the gate roller 101 into the gate 109 of the light source housing opens the microswitch 131; however, the solenoid 61 remains energized through the holding contacts 133 of the relay 135. The switch 141 is thrown to the position of FIG. 4 energizing the drive motor 17 and de-energizing the relay 135. Relay contacts 133 open de-energizing the rotary solenoid 61 and releasing the detent pawl 47 from the detent disc 41. The film drive sprocket 95 freely rotates in a counterclockwise direction drawing the film across the exposure aperture 93. The control circuitry illustrated prevents movement of the film prior to energization of the motor thus preventing accidental movement of the film in the aperture gate 109. As previously mentioned, the spacing of the detents 45 on the detent disc 41 and the spacing of the pulse generating holes 49 is such that a pulse will be generated for each frame driven across the exposure aperture 93 and will occur at the frame line. As was previously described, the detent disc 41 is detachably secured to the detent disc drive drum 35 by the mounting screws 43. This feature facilitates removal of the detent disc so that alternative discs having different detent 45 and hole 49 spacing may be readily secured to the drive drum 35 so as to accommodate various drive sprocket sizes, thus permitting different film formats to be accommodated. In this connection, it will be appreciated that a detent disc which has been fabricated for use with super 8 film will contain a significantly greater number of detents and associated apertures than will a disc which has been fabricated for 35mm film.

Although this invention is particularly shown and described in connection with an illustrated embodiment, it will be understood that various changes in form and detail may be made without departing from the spirit and scope of the invention as set forth in the following claims.

What is claimed is:

1. An apparatus for generating a signal related to the quantity of film passing through a film printer having an exposure aperture comprising:
   power drive means, film drive means coupled to said power drive means and engaging the film for driving the film through the printer and across the exposure aperture, signal generating means coupled to said film drive means providing a signal related to the length of film transported through said printer across the exposure aperture and means for synchronizing the start of said signal generating means to the occurrence of a relative alignment of a predetermined point on said film with respect to the exposure aperture of the printer, said synchronizing means including a member rotatably driven with said film drive means and means for locking said rotatably driven member in a preselected position.

2. An apparatus as set forth in claim 1 which further includes manual drive means coupled to said film drive means and said rotatably driven member to permit manual positioning of said member and said film drive means with respect to the exposure aperture of the printer.

3. An apparatus as set forth in claim 1 wherein said rotatably driven member comprises a disc, the circumference of said disc defining at least one detent and a pawl selectively positionable for mating contact with the circumference of said disc for engagement with said detent so as to restrain the movement of said disc in said preselected position.

4. An apparatus as set forth in claim 3 wherein said disc carries said signal generating means and wherein the circumference of said disc defines a plurality of spaced detents.

5. An apparatus as set forth in claim 4 wherein said detents defined by said disc are equally spaced about the circumference of said disc by an arcuate distance related to the format of the film and wherein said disc defines a plurality of spaced light transmitting apertures.

6. The apparatus of claim 5 wherein each of said light transmitting apertures defined by said disc are radially aligned with one of said detents defined by said disc and are positioned in a circular path concentric with said disc and photocell means aligned with the circular path of said light apertures defined by said disc so that rotation of said disc intermittently interrupts the passage of light to said photocell to produce a pulse rate related to the rotation of said disc and to the movement of the film through the printer.

7. The apparatus of claim 3 which further includes electrically operable means coupled to said pawl, said electrically operable means serving to move said pawl selectively into mating engagement with the circumference of said disc.

8. The apparatus of claim 7 which further includes a gate closing member selectively positionable from a first position assuring engagement of said film with said film drive means and against said printer aperture to second position which facilitates threading of said film in the printer and switch means controlling said electrically operable means so as to engage said pawl with said disc when said gate closing member is in said second position.

9. The apparatus of claim 8 which further includes manual drive means coupled to said film drive means and said disc to permit manually positioning of said film drive means and said disc with respect to the printer exposure aperture.

10. The apparatus of claim 8 which further includes a control means for maintaining said electrically operable means in an energized condition while said power drive means is in a de-energized condition.

* * * * *